(12) United States Patent
Sandelman

(10) Patent No.: US 10,674,752 B2
(45) Date of Patent: Jun. 9, 2020

(54) VAPOR PRESSURE CONTROL SYSTEM

(71) Applicant: David Sandelman, Perkinsville, VT (US)

(72) Inventor: David Sandelman, Perkinsville, VT (US)

(73) Assignee: JDS Consulting, Perkinsville, VT (US)

( * ) Notice: Subject to any disclaimer, the term of this patent is extended or adjusted under 35 U.S.C. 154(b) by 358 days.

(21) Appl. No.: 15/414,716

(22) Filed: Jan. 25, 2017

(65) Prior Publication Data

US 2019/0133155 A1    May 9, 2019

Related U.S. Application Data

(60) Provisional application No. 62/291,168, filed on Feb. 4, 2016.

(51) Int. Cl.
| A23L 3/00 | (2006.01) |
| A23C 19/14 | (2006.01) |
| F26B 21/08 | (2006.01) |
| F26B 25/22 | (2006.01) |
| A23B 4/03 | (2006.01) |
| F25D 17/04 | (2006.01) |
| A23B 4/00 | (2006.01) |
| A23C 19/097 | (2006.01) |

(52) U.S. Cl.
CPC ............... *A23L 3/003* (2013.01); *A23B 4/03* (2013.01); *A23C 19/14* (2013.01); *F25D 17/042* (2013.01); *F26B 21/08* (2013.01); *F26B 25/22* (2013.01); *A23B 4/00* (2013.01); *A23C 19/097* (2013.01); *A23V 2002/00* (2013.01); *F25D 2317/04111* (2013.01); *F25D 2700/10* (2013.01); *F25D 2700/12* (2013.01)

(58) Field of Classification Search
CPC ......... A23L 3/003; A23C 19/097; A23B 4/00; F25D 17/042; F25D 2700/12; F25D 2700/10; F25D 2317/0411

See application file for complete search history.

(56) References Cited

U.S. PATENT DOCUMENTS

| 2,325,061 A | 7/1943 | Kaufman | |
| 2,650,882 A * | 9/1953 | Sperti | A23L 13/76 426/248 |
| 4,856,227 A | 8/1989 | Oglevee | |
| 5,069,039 A | 12/1991 | Martin | |
| 5,346,129 A * | 9/1994 | Shah | F24F 3/1405 236/44 C |
| 6,223,543 B1 | 5/2001 | Sandelman | |
| 6,460,359 B1 * | 10/2002 | Lauwers | B01D 5/0039 62/227 |
| 6,826,921 B1 * | 12/2004 | Uselton | F24F 3/153 62/176.6 |
| 7,836,712 B2 | 11/2010 | Sasao | |
| 8,718,825 B2 | 5/2014 | George | |
| 2005/0132902 A1 | 6/2005 | D'Arcangelis et al. | |
| 2006/0040029 A1 | 2/2006 | Gunawardena et al. | |

(Continued)

*Primary Examiner* — Larry L Furdge
(74) *Attorney, Agent, or Firm* — Levisohn Berger LLP

(57) ABSTRACT

A system to control the conditions of an aging room for food in which independent feedback loops control the dry bulb temperature and the dew point while controlling the difference between the vapor pressure in the room and the vapor pressure of the food stuff being aged, thereby controlling the "aging" of the food stuff and its quality.

5 Claims, 2 Drawing Sheets

(56) References Cited

U.S. PATENT DOCUMENTS

| | | | |
|---|---|---|---|
| 2006/0130498 A1* | 6/2006 | Joshi | A23L 3/3445 |
| | | | 62/127 |
| 2006/0242972 A1* | 11/2006 | Shavit | F25D 13/00 |
| | | | 62/150 |
| 2008/0196427 A1* | 8/2008 | Bianchi | F25D 17/042 |
| | | | 62/176.6 |
| 2009/0211274 A1 | 8/2009 | Meng | |
| 2010/0127089 A1 | 5/2010 | Sakami | |
| 2012/0060526 A1 | 3/2012 | May et al. | |
| 2014/0345307 A1* | 11/2014 | Bagley | F25B 49/02 |
| | | | 62/115 |
| 2015/0057812 A1* | 2/2015 | Zhao | G05B 13/0205 |
| | | | 700/276 |

* cited by examiner

VAPOR PRESSURE CONTROL SYSTEM

RELATED APPLICATION

This application claims the priority of provisional patent application Ser. No. 62/291,168, filed Feb. 4, 2016, the substance of which is incorporated herein.

BACKGROUND OF THE INVENTION

Various products require time for what is called either "aging" or "drying". Cheeses and meats have historically been aged in caves. The local climate, geological conditions and season, dictated the temperature and humidity in the caves. Due to these varied conditions, different styles and types of products come from different locations. People are now making aged cheeses and meats of all different types, and in all locations around the world. The challenge they face is controlling/creating the proper conditions in the rooms where the product is being dried or aged. At present most facilities try to control the temperature in the room (dry bulb) and humidity (% RH) with limited success. % Relative Humidity is calculated using the Partial Vapor Pressure ($e_w$)/Saturated Vapor Pressure ($e^*_w$)*100. The Saturated Vapor Pressure changes with the Dew Point. The Partial vapor pressure changes with the dry bulb temperature.

SUMMARY OF THE INVENTION

Trying to control the % RH in a room with a single point control system such as a Humidity control, will only work if the temperature of the room is held at a constant temperature. A more effective control requires two control loops, the $1^{st}$ control loop controls the dry bulb temperature in the room, and the $2^{nd}$ control loop controls the Saturated Vapor Pressure in the room. The Saturated Vapor Pressure in the room can also be expressed as Dew Point, which can be derived from the Wet Bulb Temperature in the room. In fact, a Dew Point sensor is the commonly used device to determine the dew point and/or the saturated vapor pressure. The preferred unit of measurement for the second control loop is Dew Point, but not limited to, since Dew Point can be measured as a primary type measurement with a chilled mirror.

In the aging/drying process of food products, water is released from the product in the form of water vapor. Each specific food product has its own vapor pressure and should be a known value. The product's ability to lose water can be measured by determining the products partial vapor pressure. This is expressed as Water Activity or $a_w$. By controlling the partial vapor pressure in the room as compared to the partial vapor pressure of the product being aged, you can control the rate at which the product loses moisture.

Food products are typically made up primarily of water and sold by weight, so the control of moisture loss from the product can have a significant impact on profitability. If the product loses more water than desired, the final product will weigh less than the optimum final weight and thereby reduce the selling price.

The rate at which cured meats lose moisture is also important, since the drying process requires the loss of free water from within the product. If the available water leaves the product too quickly, which can be caused by the vapor pressure in the drying room being too low as compared to the product's vapor pressure then this rapid loss of moisture will cause the outer layer of the product to be too dry and reduce the rate at which the moisture can leave the center of the product, trapping moisture in the core of the product. This is an undesirable outcome when aging/drying product. So a proper balance of the product vapor pressure and room vapor pressure is important. Controlling the difference will control the rate at which the product loses moisture.

In aging and drying rooms the vapor pressure is typically reduced with the use of a coil that has a surface temperature that is below the dew point of the air in the room. Since this surface temperature is below the dew point, condensation forms removing water vapor from the air in the room, which reduces the vapor pressure in the room.

At present, aging and drying rooms, typically use a simple on/off humidistat, or an on/off dry bulb thermostat to control the operation of the cooling coil. Depending on the configuration one may also introduce additional humidity or heat if required. This control configuration leads to swings of the dew point in the room as the cooling coil cycles on and off, and also wastes energy while simultaneously cooling and heating the air, commonly known as 'reheat' in the HVAC industry. One may also add moisture to the air with a humidifier, while simultaneously removing the moisture with the cooling coil, this is also an imprecise and wasteful practice.

DETAILED DESCRIPTION

Figure 1:
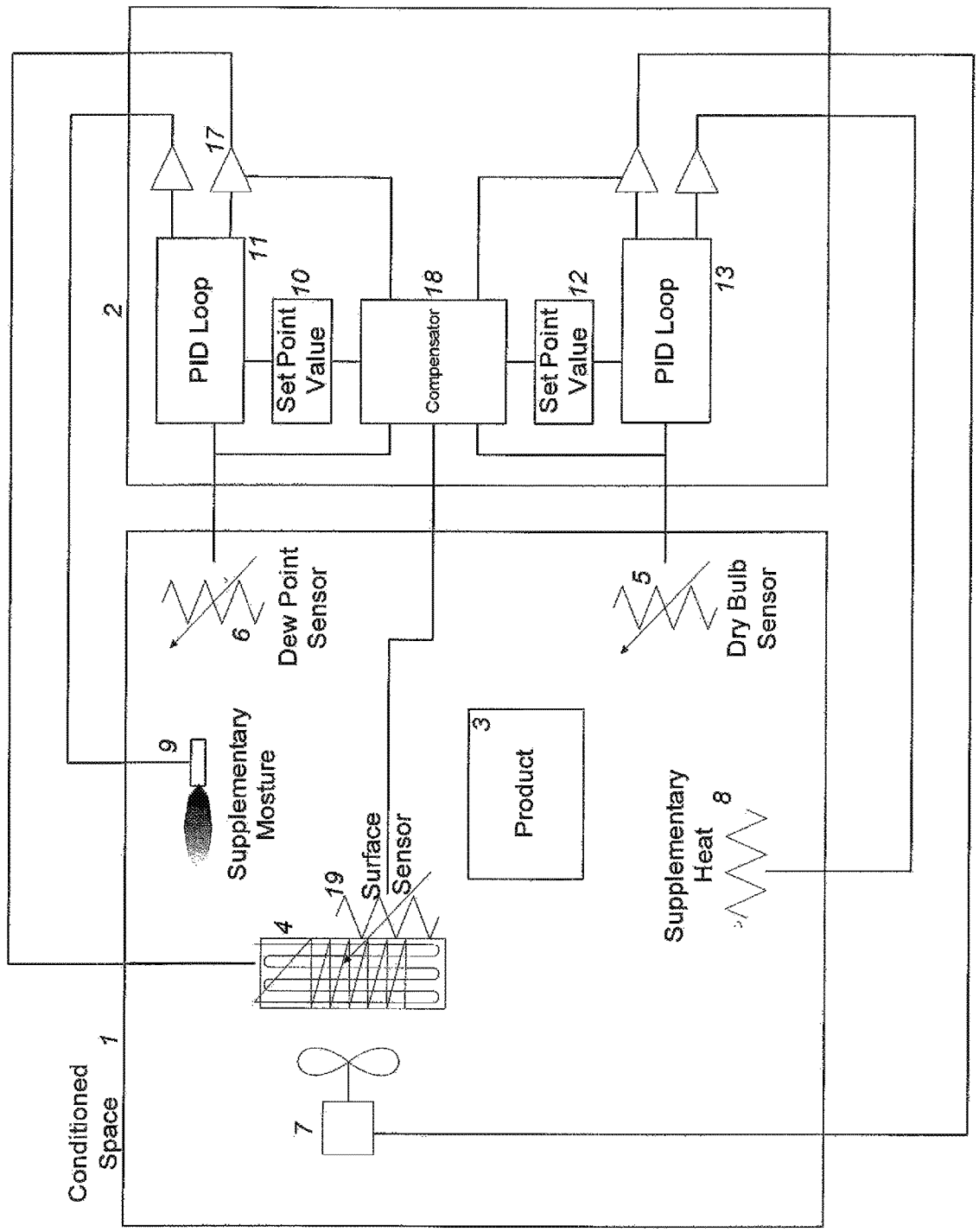
FIG. 1 is a block diagram of the control system of this invention.

The description of the invention as shown in FIG. 1 is as follows.

The controlled and conditioned space or aging room is shown as Conditioned Space 1. Within the Conditioned Space is the Product 3. Also inside the Conditioned Space 1 is a Cooling Coil 4. The Cooling Coil can have, but is not limited to means of cooling by liquids, such as chilled water, or, liquids that are evaporated in the coil, such as refrigerants. The configuration of the cooling coil, can be in the form of pipes with fins, just pipes, or cooled surface areas. When the surface temperature of the Cooling Coil 4, is above the dew point of the air in Conditioned Space 1, the Cooling Coil is limited to removing the sensible heat from the Conditioned Space 1. When the surface temperature of the Cooling Coil 4, is below the dew point of the air in the conditioned space 1, the cooling coil will both remove sensible heat, and latent heat from the conditioned space 1. The act of removing latent heat from the conditioned space 1, causes condensation to form on the cooling coil 4, thereby removing water vapor from the air. Removal of water vapor from the air in the conditioned space 4 reduces the vapor pressure of the conditioned space. The cooling coils sensible and latent capacities are a function of the coil size (heat transfer area), coil temperature and air velocity across the cooling coil's surface. The ratio of sensible and latent heat capacities of the coil can be changed by varying the temperature of the coil and the air velocity across the coil. As the air velocity increases across the coil, the sensible heat capacity goes up when the coil is above the dew point. As the air velocity decreases and the coil is below the dew point in the conditioned space 1, the latent to sensible ratio goes up, increasing the latent cooling capacity, and thereby increasing the amount of water removed from the air.

The control system 2 monitors the dry bulb temperature in the conditioned space 1 with a dry bulb sensor 5. The control system 2 also monitors the dew point in the conditioned space 1 with a dew point sensor 6. The measured values are communicated by the sensors from the conditioned space to the control system 2. The desired dry bulb and dew point conditions are set in the control system 2 via a user interface. With the use of a psychometric chart or equation, and the choice of dry bulb and dew point set points, the user can select the desired relative humidity in the conditioned space 1.

The dry bulb set point is set point value 12, and the dew point set point is set point value 10. There are two independent PID control loops. (PID stands for a feedback loop which has proportional integrative and derivate properties.)

PID control loop 13 uses the dry bulb sensor value 5 and the dry bulb set point value 12 to calculate an error value. The error value is used to control the flow of air across the cooling coil 4. One output of PID loop 13 is connected through buffer amplifier 14 to fan 7, while the other output of PID loop 13 is connected to supplementary heat 8 through buffer amplifier 15. The air flow across the coil can be controlled by the speed of a fan 7 or the position of a damper, that steers the flow of air across the coil. As the dry bulb temperature of the conditioned space 1 increases above the desired dry bulb set point 12, this will create a positive error, and the speed of the air flow will be increased so that the sensible cooling capacity of the cooling coil is increased, thereby increasing the removal of sensible heat from the conditioned space 1. As the dry bulb temperature of the conditioned space 1 decreases and approaches the desired dry bulb set point 12, the speed of the air flow is decreased, so that the sensible cooling capacity of the cooling coil is reduced. If the dry bulb temperature of the conditioned space 1 continues to fall below the desired dry bulb set point 12, this would create a negative error, and a source of supplementary heat 8, located in the conditioned space 1, would be turned on. As the negative error between the desired dry bulb set point 12 and the dry bulb sensor 5 increases, the output to the supplementary heat is increased. The supplementary heat may be controlled in either an On/Off mode, with a temperature differential between on and off, or in a proportional mode where the output of the supplementary heat 8 is variable.

One output of PID loop 11 is connected through buffer amplifier 16 to Supplementary moisture 9 and another output 15 is connected through buffer amplifier 17 to affect cooling coil 4.

PID control loop 11 uses the dew point sensor value 6 and the dew point set point value 10 to calculate an error value that is used to control the temperature of the coiling coil 4. The temperature of the cooling coil 4 can be changed by controlling the position of a valve that regulates the flow of cooling liquid that is allowed to flow into the cooling coils recirculation loop. Or in an evaporative cooling coil, an adjustable valve is placed on the discharge, or low pressure side of the coil, also referred to as the suction side. Varying the flow capacity of this valve will vary the pressure on the suction side of the evaporator coil, which controls the temperature at which the refrigerant evaporates at, thereby allowing the control of the temperature of the coil.

As the dew point temperature of the conditioned space 1 increases above the desired dew point set point 10, this will create a positive error and the temperature of the cooling coil 4 will be reduced. Reducing the temperature of the cooling coil increases the coil's latent capacity, and thereby removes more water from the air and reduces the dew point in the conditioned space 1. As the dew point temperature of the conditioned space 1 decreases and approaches the desired dew point set point 10, the temperature of the coil is increased, so that the latent cooling capacity of the cooling coil is reduced.

If the dew point temperature of the conditioned space 1 continues to fall below the desired dew point set point 10, this would be a negative error and a source of supplementary moisture 9 located in the conditioned space 1 is turned on. As the negative error between the desired dew point set point 10 and the dew point sensor 6 increases the output to the supplementary moisture 9 is increased. The supplementary moisture 9 may be controlled in either an On/Off mode with a temperature differential between on and off, or in a proportional mode where the output of the supplementary moisture 9 is variable.

While the above control strategy works well when the dew point in the conditioned space 1 causes a positive error, which in turn, causes the cooling coil 4 to be below the dew point in the room, and the dry bulb temperature in the conditioned space 1 to also have a positive error, the dry bulb temperature of the room can be brought down to the desired set point. A problem occurs when the dew point error is at or close to 0, and the cooling coil is no longer being cooled, and there is no need to further reduce the dew point in the conditioned space 1 and, the dry bulb temperature of the room is above the set point, causing a positive dry bulb error. At this point, increasing the flow of air across the cooling coil which has limited or no sensible capacity, caused by the small dew point error value, the conditioned space will remain above the desired dry bulb set point.

By introducing a sensor on the surface of the cooling coil, surface sensor 19, the surface temperature of the cooling coil can now be communicated to the control system 2. When the compensator 18 sees that the value of the dew point sensor 6 and the dew point set point value 10 are relatively close, meaning the control is maintaining the dew point set point, and there is a relatively large positive error between the dry bulb sensor 5 and the dry bulb set point value 12, the control compensator will provide bias to the output signal 17 that is coming out of the dew point PID loop 11. This will cause the cooling coil 4 to be lower in temperature, thereby increasing the coil's sensible capacity and reducing the conditioned space dry bulb temperature. The surface sensor 19 monitors the temperature of the cooling coil 4 and limits the temperature of the coil just above the desired dew point. This is a user adjustable value that is set as an offset to the dew point set point value 12. This offset would normally be set to a value of zero, which would mean the cooling coil 4 surface temperature is limited to the dew point set point, or positive by a value that will keep the coil surface temperature above the dew point set point value. Since it is a user selectable value, in some cases the user may set this value to a negative value so that the cooling coil can go below the dew point setting 10 if desired. Setting the offset to 0 or a positive value will prevent the coil from having latent capacity, since it is at or above the dew point and the coil can now provide just sensible cooling to reduce the dry bulb temperature in the conditioned space 1. As the dry bulb temperature in the conditioned space 1 as measured by the dry bulb sensor 5, approaches the dry bulb set point value 12, the amount of bias applied to the dew point PID loop 11 output 17 is reduced. This is where the invention allows an error in the dry bulb control loop to effect the output of the dew point control loop.

Figure 2:
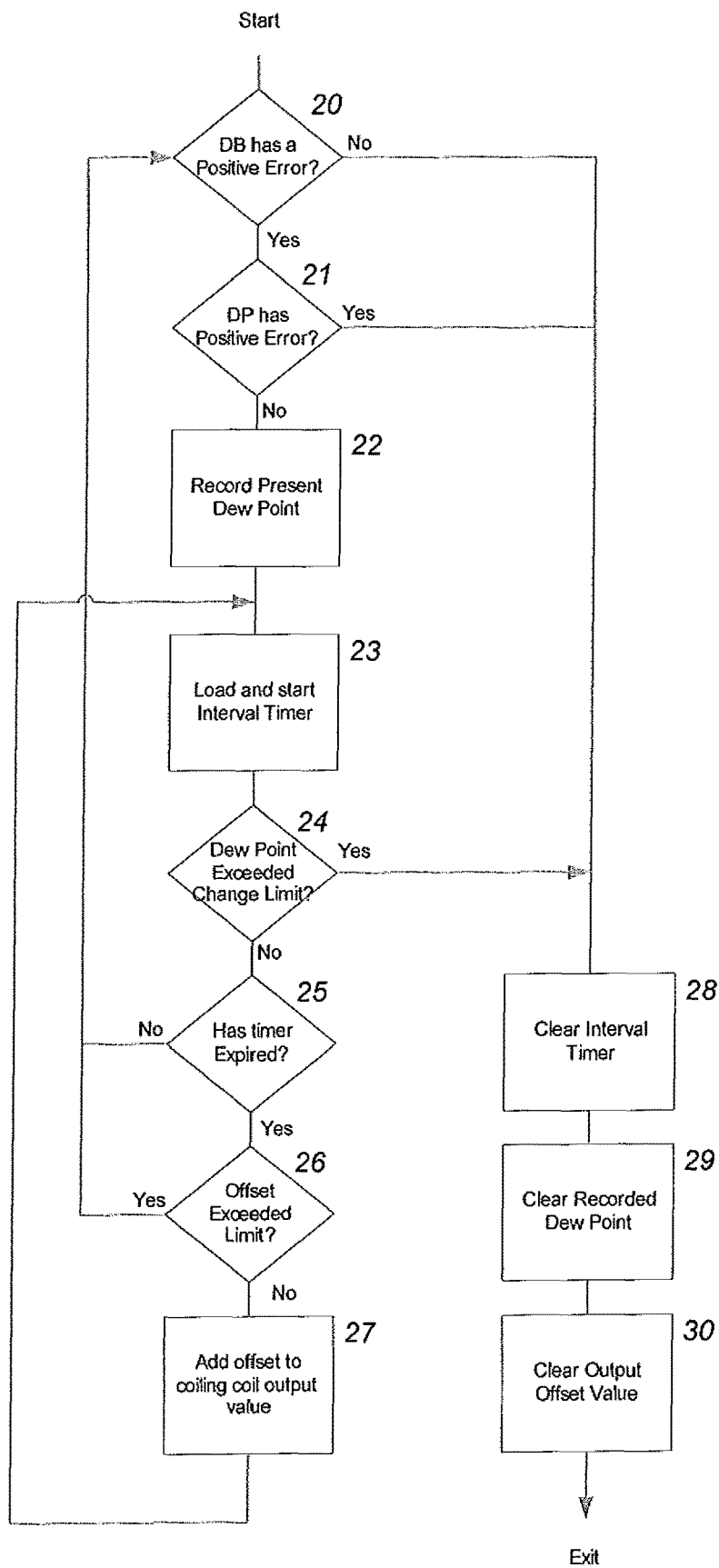
FIG. 2 is a flow chart of an alternative system to deal with certain operating issues, as described.

An alternative method to deal with the condition of a small or no latent load, while there is a sensible load, as outlined above, can also be accomplished without the use of a surface sensor 19. In this method, as shown in FIG. 2, the compensator 18 monitors if there is a positive error between the dry bulb set point 12 and the actual dry bulb as measured by dry bulb sensor 5 in the conditioned space; this decision is shown as block 20. If there is a positive error which indicates a need for sensible cooling, an additional decision as in block 21 is made to determine if there is not a positive error between the dew point set point 6 and the actual dew point in the conditioned space, as sensed by the dew point sensor 6.

Not having a positive error in the Dew Point PID loop 11, would indicate the latent load is satisfied, and there will be little or no output to the cooling coil 6. At this point in time when these conditions are true, the present Dew Point in the conditioned space is recorded 22 as sensed by the dew point sensor 6 in the conditioned space. An interval timer 23, which the amount of time is user selectable is loaded, and timing is started at this point in time.

This interval timer periodically allows the compensator 18 to add an user selectable amount of offset to the output 17 to the cooling coil 4, thereby reducing the temperature of coil. Reducing the temperature of the coil 4 increases the coils sensible capacity in an effort to reduce the error of the dry bulb temperature of the conditioned space, Block 24 monitors the dew point in the conditioned space as measured by the dew point sensor 6 and compares it to the value of the dew point in the conditioned space that was recorded by block 22 at the start of this process. If the dew point in the conditioned space has decreased by a user selectable amount, that would indicate the dew point in the conditioned space is starting to drop by an unacceptable amount. Block 24 will cause the process to abort, and clear the interval time block 28, the recorded dew point block 29 and the output offset value block 30. The interval timer is tested as in block 25, to see if additional offset can be added to the output of the cooling coil. This periodic interval of time, allows for the thermal lags in the system to take place over time, as not to add too much cooling to the coil too quickly, causing the coil to get too cold, and thereby drying the conditioned space. There is also a user selectable amount that will limit the amount of offset that can be added to the output to the coil during this process that is tested at 26. Once the limit is reached, no further offset is added but the output of the coil is left at this level, until dew point limit is exceeded in block 24, or the dry bulb positive error has been eliminated at block 20, at which point the interval timer is cleared in block 28, the recorded dew point is cleared at block 29, and the output offset is set back to 0, in block 30.

The present invention has been described with relationship to cheese and meat. Other systems such as hydroponic growing installations such as for bean sprouts can advantageously use this system. Other food products can also benefit from this system.

It should be understood that the preferred embodiment was described to provide the best illustration of the principles of the invention and its practical application to thereby enable one of ordinary skill in the art to utilize the invention in various embodiments and with various modifications as are suited to the particular use contemplated.

The invention claimed is:

1. A system for controlling the drying and aging of a food product having a specific vapor pressure, said food product located within an aging room, said system comprising:
   a first sensor to determine the dry bulb temperature in said aging room,
   a second sensor to determine the dew point value in said aging room, and
   a controller responsive to the dew point value in said aging room with respect to the vapor pressure of the food product to control the aging of said food product,
   wherein said controller comprises two independent PID control loops, one of said two PID control loops controls the dry bulb temperature and the other of said two PID control loops controls said dew point value, and
   wherein said system comprises cooling coils, said controller responsive to the dew point value in said aging room controlling the temperature of said cooling coils,
   wherein said system further comprises a fan, said controller also responsive to the dry bulb temperature to control the air flow through the said cooling coils with said fan,
   wherein said system comprises a compensator which communicates an error signal in said dry bulb control loop to bias the dew point control loop set point value.

2. The system for controlling the aging of a food product according to claim 1 wherein said controller removes water vapor from said aging room to relieve the vapor pressure of said aging room.

3. The system for controlling the aging of a food product according to claim 1, further comprising a surface sensor located on said cooling coil, said surface sensor monitoring the temperature of said cooling coil.

4. The system for controlling the aging of a food product according to claim 1, wherein said controller is responsive to a condition of no latent load while there is a sensible load, said controller controlling the temperature of said cooling coils.

5. The system for controlling the drying and aging of a food product according to claim 1 wherein said system simultaneously controls the temperature of said cooling coils to control the dew point value and at the same time controls the air flow across said cooling coils to control the dry bulb temperature and dew point to be at substantially constant values.

* * * * *